Patented Dec. 24, 1940

2,226,407

UNITED STATES PATENT OFFICE 2,226,407

LUMINESCENT MATERIAL

Alfred H. McKeag, Middlesex, England, assignor to General Electric Company, a corporation of New York No Drawing. Application February 27, 1939, Serial No. 258,860. In Great Britain March 16, 1938

3 Claims. (Cl. 250—81)

This invention relates to an improvement in luminescent materials of the type described in British patent application No. 10,922/37, now British Patent 495,706, the corresponding United States case being application Serial No. 201,810, Alfred H. McKeag and John T. Randall, filed April 13, 1938, now Patent #2,191,351.

The material referred to above contains as essential elements cadmium, manganese, chlorine, phosphorus and oxygen, has a crystal structure in which the unit cell is hexagonal with axes substantially $a_0=9.7$ A. U. and $c_0=6.4$ A. U., and emits under excitation by radiation of wavelength 2536 A. U. luminescent light whose color is warm, i. e., it departs from white in the direction of yellow or red and not in the direction of green or blue. The material thus consists essentially of a matrix of cadmium chloro-phosphate, of the composition generally written as $$3Cd_3(PO_4)_2.CdCl_2,$$

containing manganese as an activator, or it may be described as a cadmium chloro-phosphate with part of the cadmium replaced by manganese and corresponding substantially to the formula $(Cd, Mn)_5(PO_4)_3Cl$. For a further description of this material and its preparation, reference may be had to the United States application and British patent referred to above.

According to the present invention, I have found that the addition of small proportions of metals other than cadmium and manganese to these materials increases greatly the duration of the luminescence after the excitation is removed without reducing seriously the intensity of the luminescence while the excitation lasts. Increase of afterglow duration is desirable when the material is associated with discharge lamps, for it reduces flicker. It is also desirable in some circumstances (but not in all) when the material is used for the screen of a cathode-ray tube. The metals so far found most suitable are vanadium, columbium, tantalum, and tin. Of these vanadium appears to be the best. The proportion of the metal should not exceed 1 per cent of the whole material, for large amounts decrease the intensity of the luminescence. A proportion as low as 0.0001 per cent may have some effect in increasing the duration; a proportion in the neighborhood of 0.005 to 0.01 per cent is generally preferable.

Therefore, according to the invention a luminescent material of the kind described above contains in addition to the said essential elements not more than 1 per cent of a metal or metals other than cadmium and manganese, whereby the duration of the luminescence after the cessation of the excitation is substantially greater than in the absence of the said other metal or metals.

In one method of preparing a luminescent material according to the invention, 480 gm. of cadmium sulphate is dissolved in 1500 ml. of boiling distilled water, and 160 gm. of di-ammonium hydrogen orthophosphate is dissolved in 1000 ml. of boiling distilled water. 10 ml. of the second solution is added to the whole of the first, the precipitate formed is filtered off and discarded. The remainder of the second solution is added to the filtrate; the precipitate is filtered off, washed well with hot distilled water, and dried at 180° C. for three hours. This precipitate, which is some kind of cadmium phosphate, is called precipitate A.

Then 370 gms. of manganous sulphate are dissolved in 1500 ml. of boiling distilled water and 160 gm. of di-ammonium hydrogen phosphate in 1000 ml. of boiling distilled water. The solutions are mixed and the precipitate formed is washed and dried at 180° C. This is precipitate B.

Precipitates A and B are mixed with solid cadmium chloride in the ratios of 100 parts by weight of A to 5 parts of B to 20 parts of cadmium chloride. Then 0.005 to 0.01 per cent of vanadium in the form of pentoxide is added to the mixture. The substances are ground and thoroughly mixed together and the mixture is heated in a tubular boat, having one end closed by a glass wool plug, to 800° C. for half an hour. The resulting material is washed by decantation with hot distilled water six times and dried at 180° C. for two hours.

If columbium or tantalum is used, it may be introduced as the pentoxide; if tin is used, it is preferably introduced as stannous chloride.

What I claim as new and desire to secure by Letters Patent of the United States is:

1. A luminescent material containing as essential elements cadmium, manganese, chlorine, phosphorous and oxygen and having a crystal structure in which the unit cell is hexagonal with axes substantially $a_0=9.7$ A. U. and $c_0=6.4$ A. U., said material containing also not over one per cent of one or more additional metals of the group consisting of vanadium, columbium, tantalum and tin.

2. A luminescent material consisting of a cadmium chloro-phosphate with part of the cadmium replaced by manganese and corresponding substantially to the formula $(Cd, Mn)_5(PO_4)_3Cl$, said material containing also not more than one per cent of one or more additional metals of the group consisting of vanadium, columbium, tantalum and tin.

3. A luminescent material consisting of a manganese-activated cadmium chloro-phosphate containing not over about 1 per cent of vanadium which materially increases the duration of luminescence of the material after cessation of excitation thereof without materially reducing the intensity of the luminescence during excitation.

ALFRED H. McKEAG.